J. B. LEE.
ELECTRIC LIGHTING.
APPLICATION FILED MAR. 7, 1910. RENEWED FEB. 16, 1916.
1,198,857.
Patented Sept. 19, 1916.
11 SHEETS—SHEET 1.
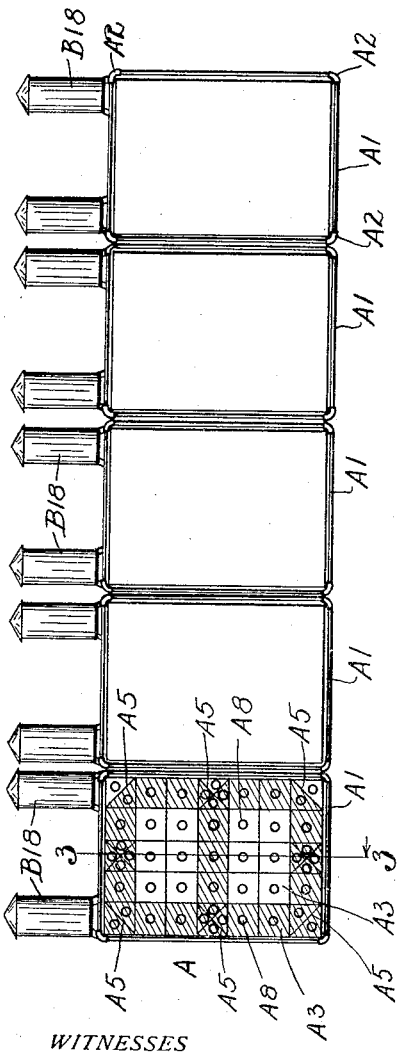
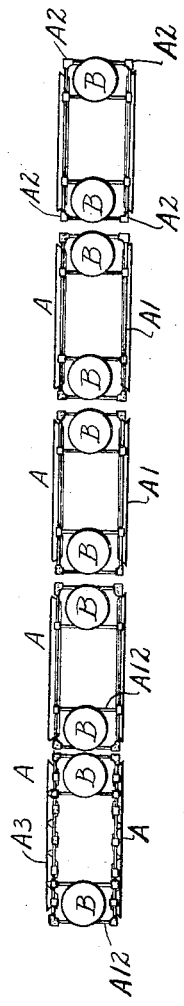
WITNESSES
INVENTOR
James B. Lee
By Cyrus Kehr
Attorney

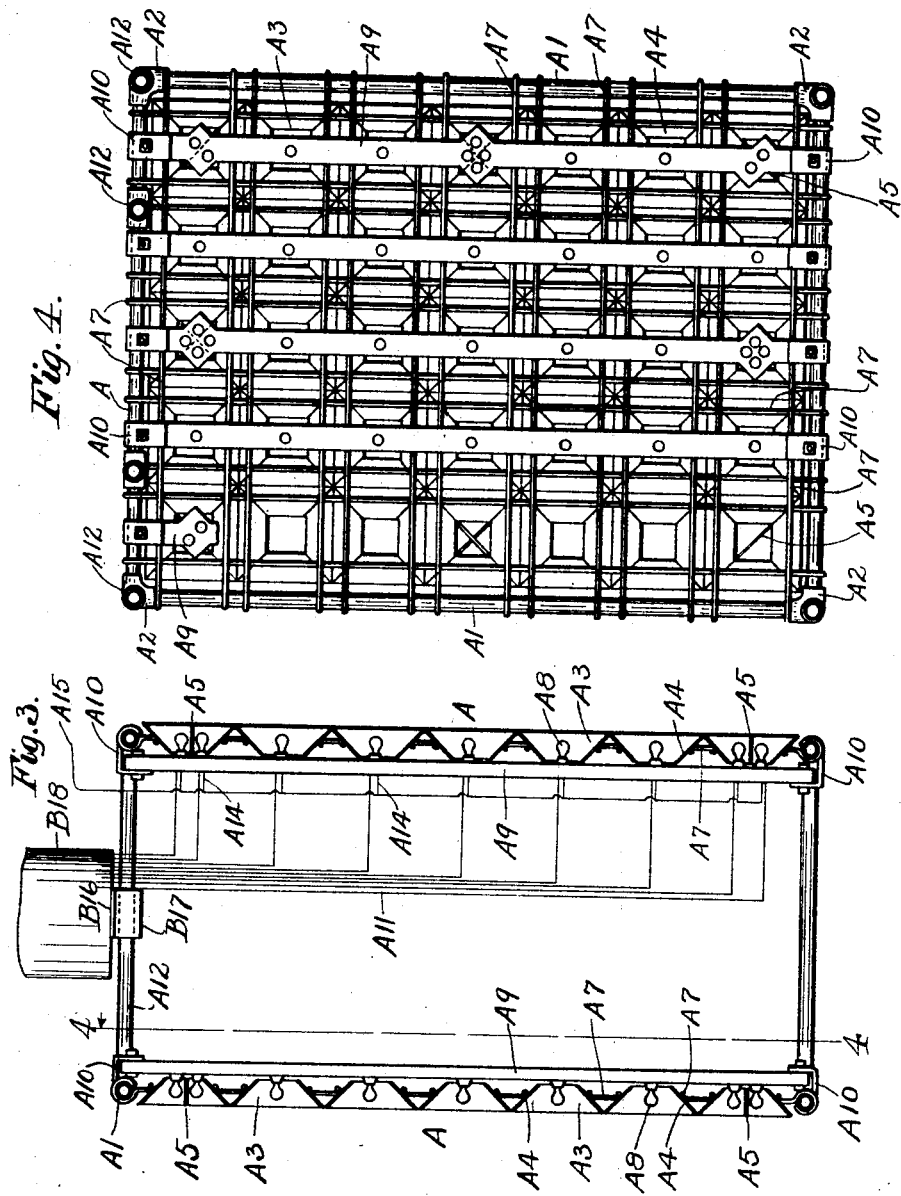

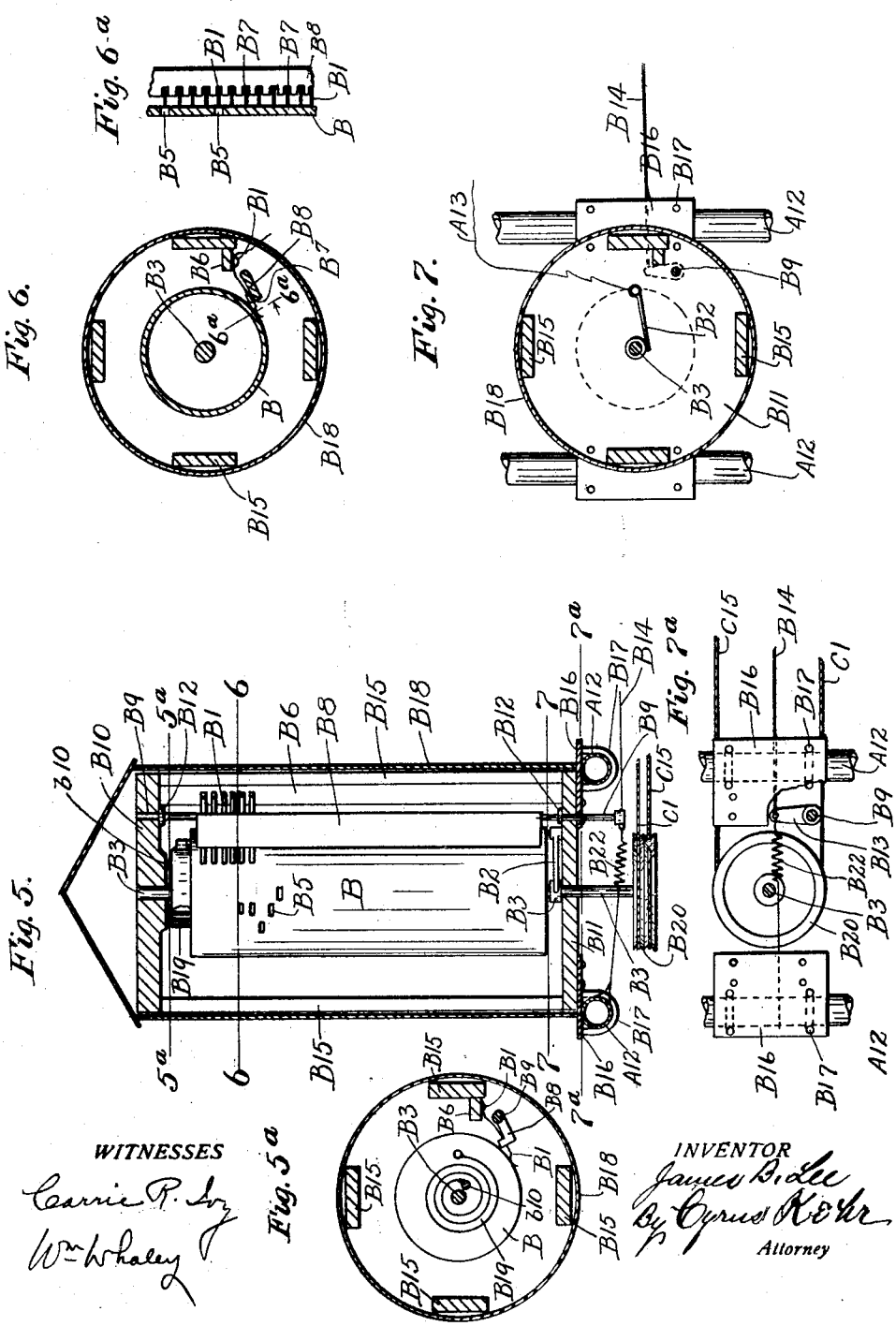

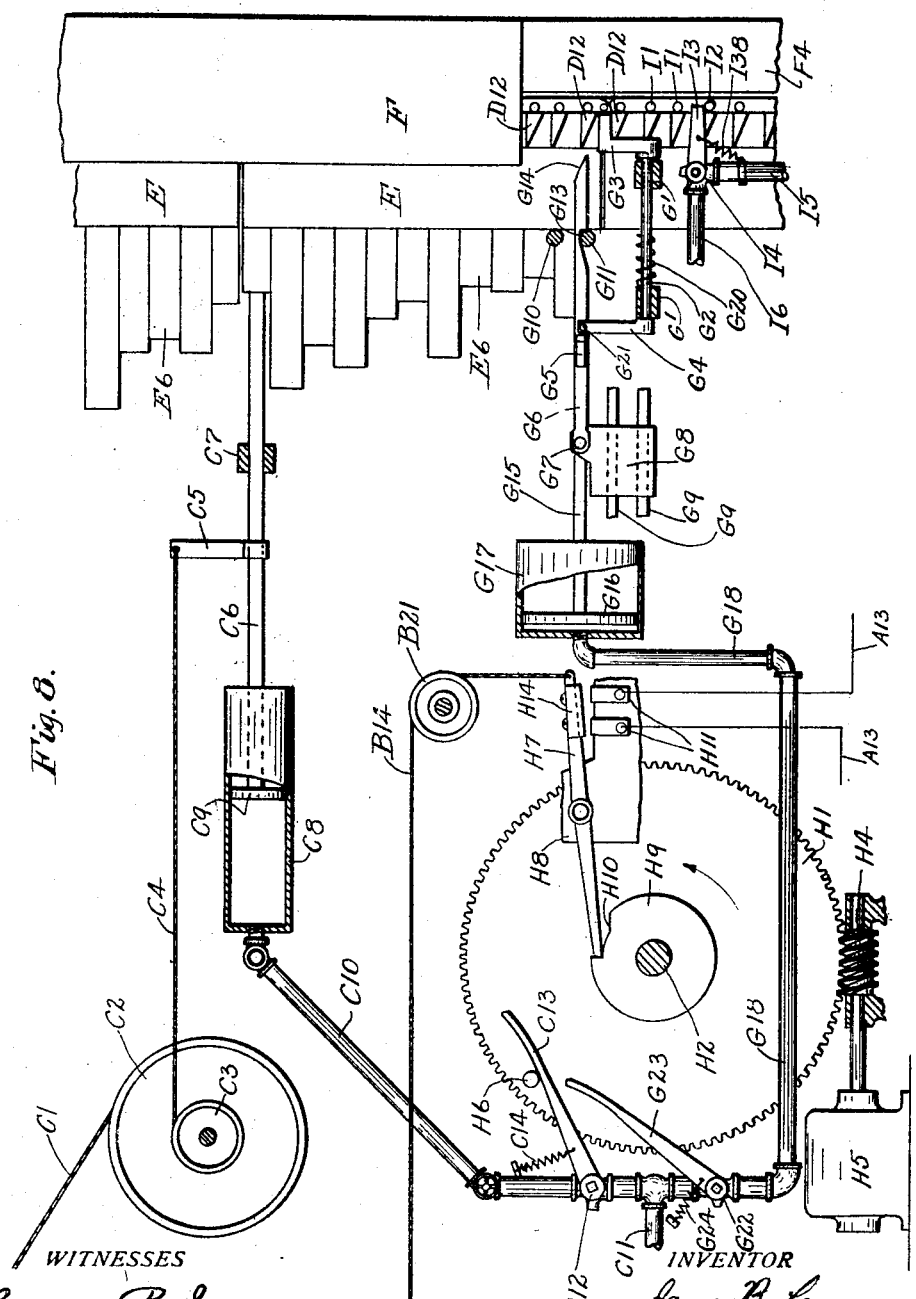

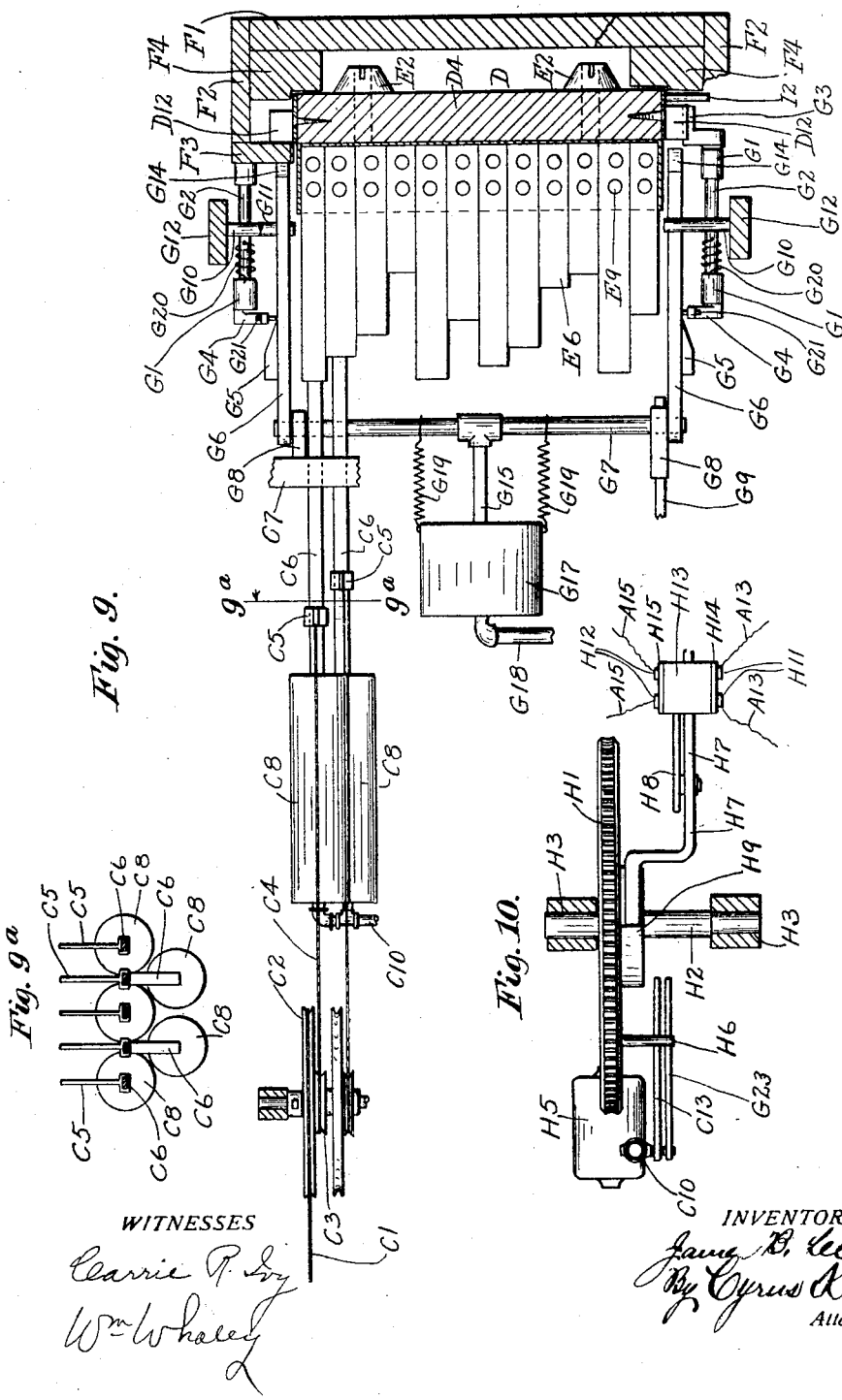

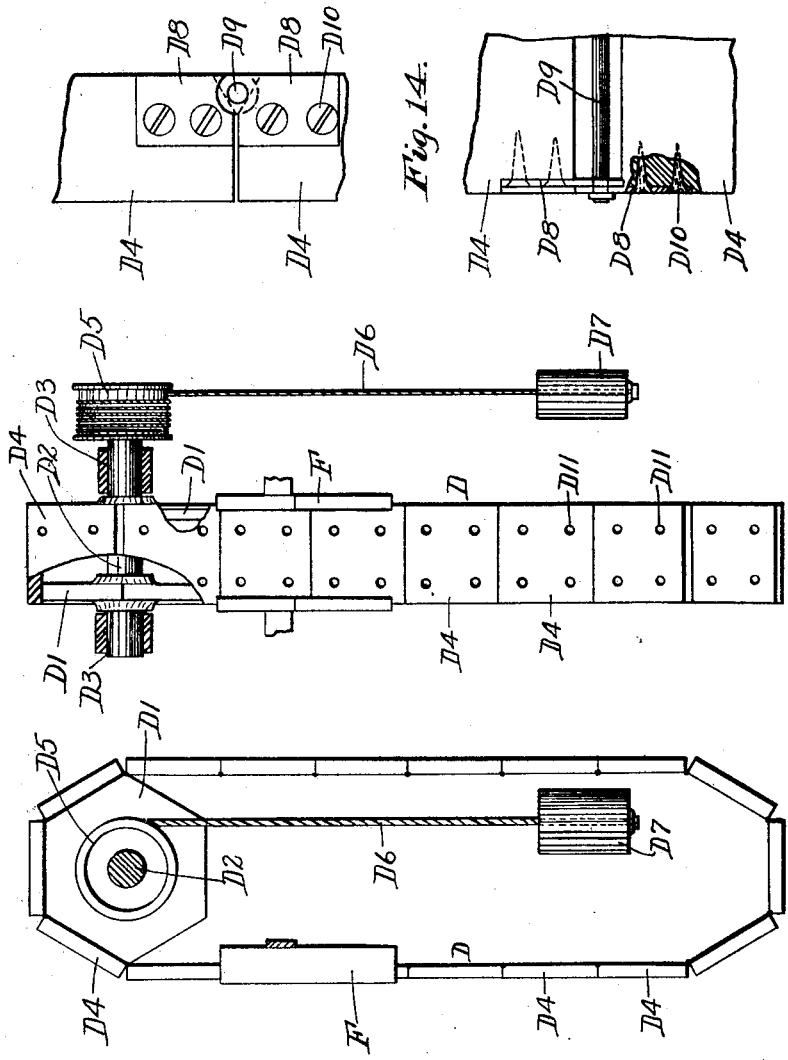

J. B. LEE.
ELECTRIC LIGHTING.
APPLICATION FILED MAR. 7, 1910. RENEWED FEB. 16, 1916.
1,198,857.
Patented Sept. 19, 1916.
11 SHEETS—SHEET 7.
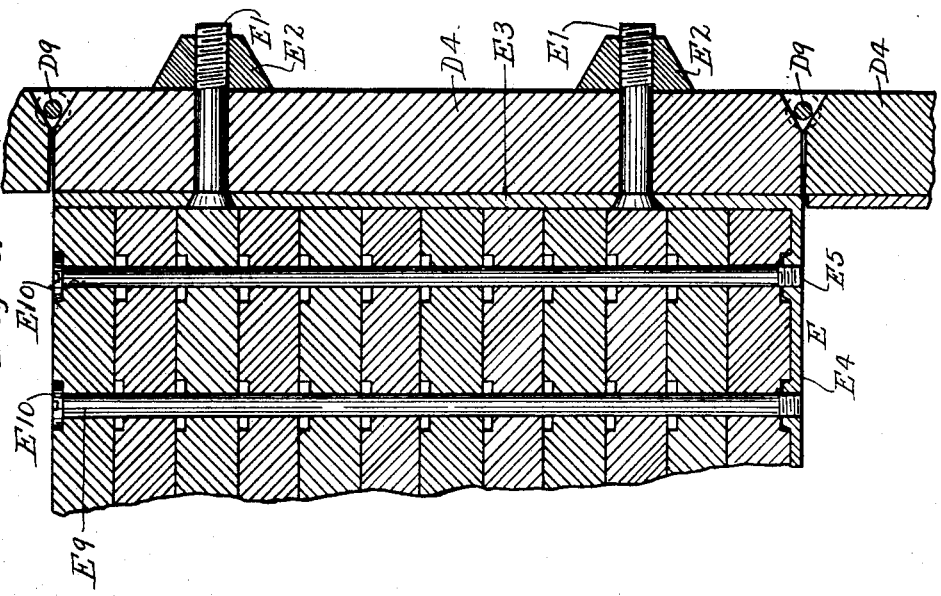
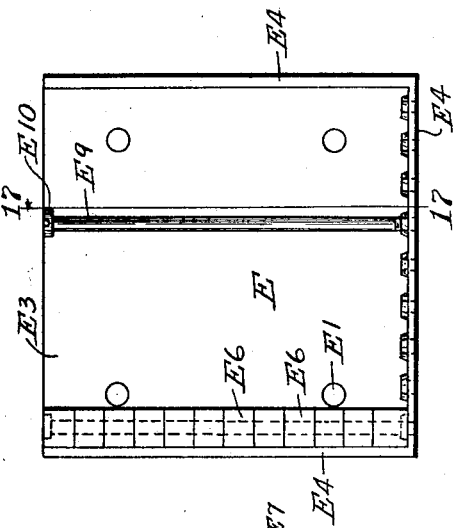
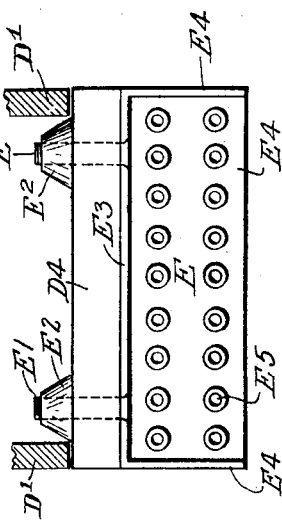
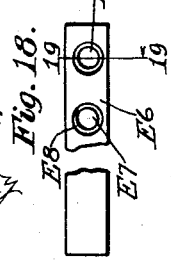
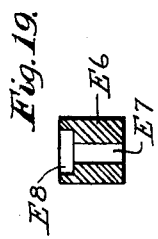
WITNESSES
INVENTOR
James B. Lee
By Cyrus Kehr
Attorney

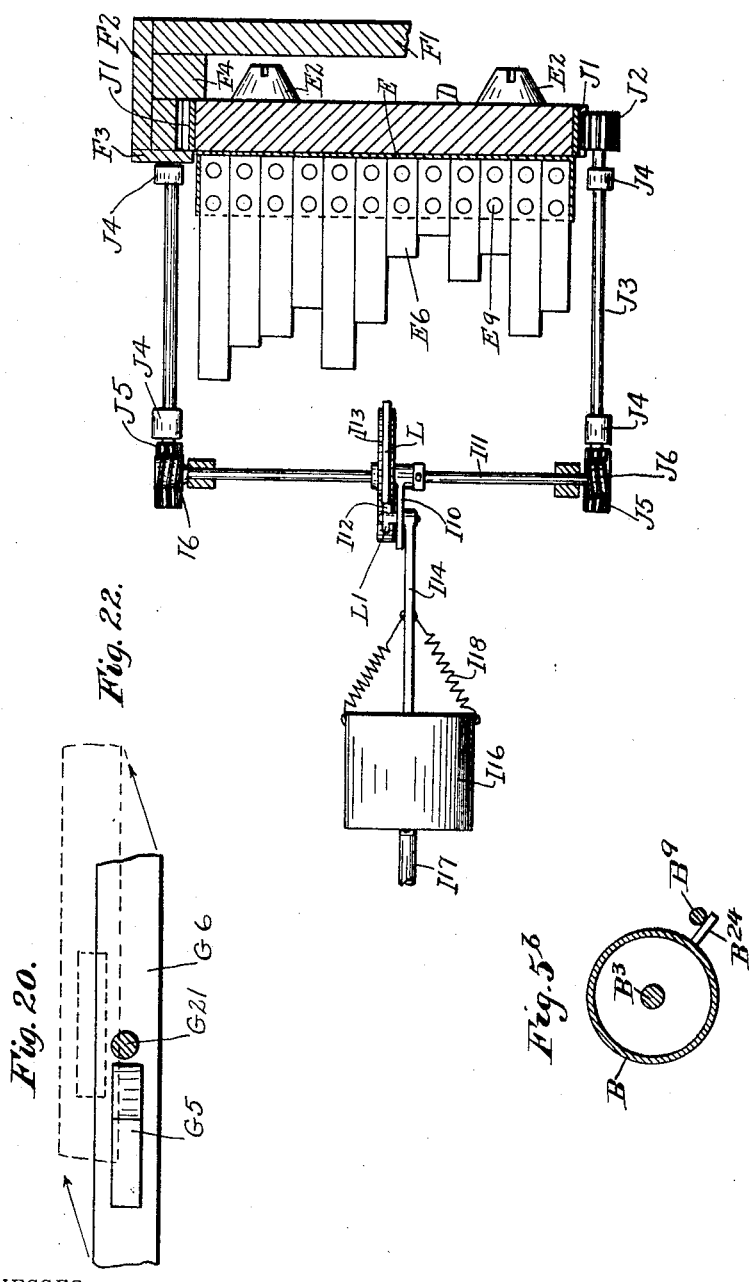

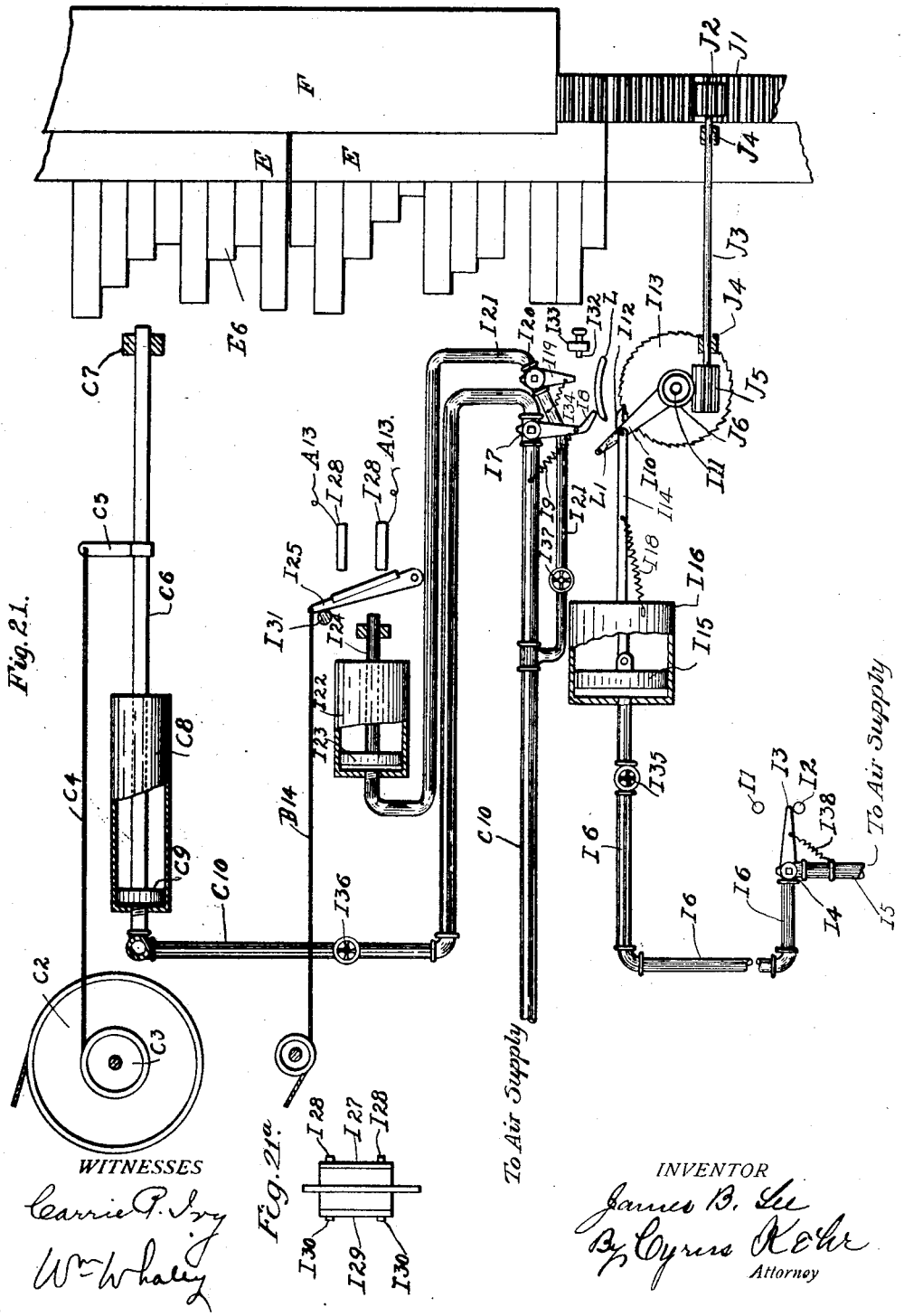

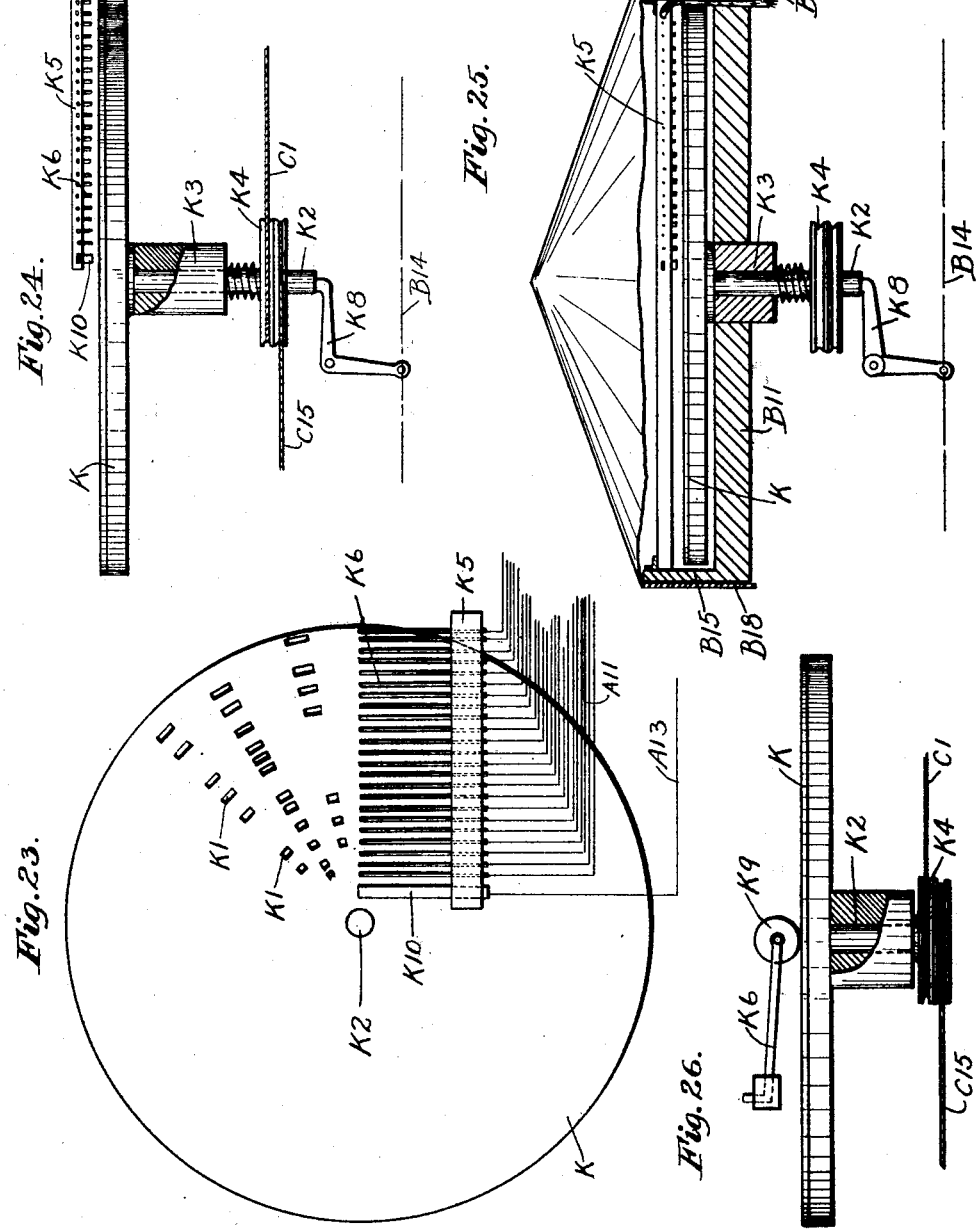

J. B. LEE.
ELECTRIC LIGHTING.
APPLICATION FILED MAR. 7, 1910. RENEWED FEB. 16, 1916.
1,198,857.
Patented Sept. 19, 1916.
11 SHEETS—SHEET 11.
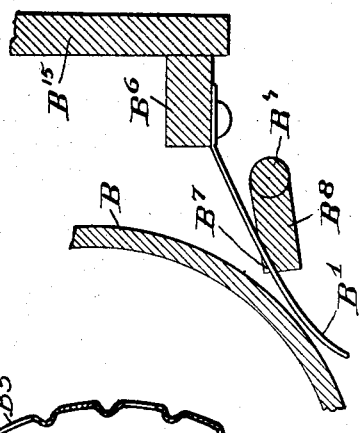
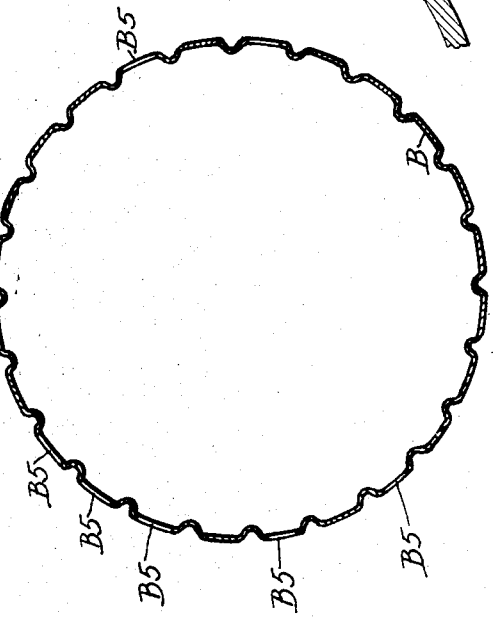
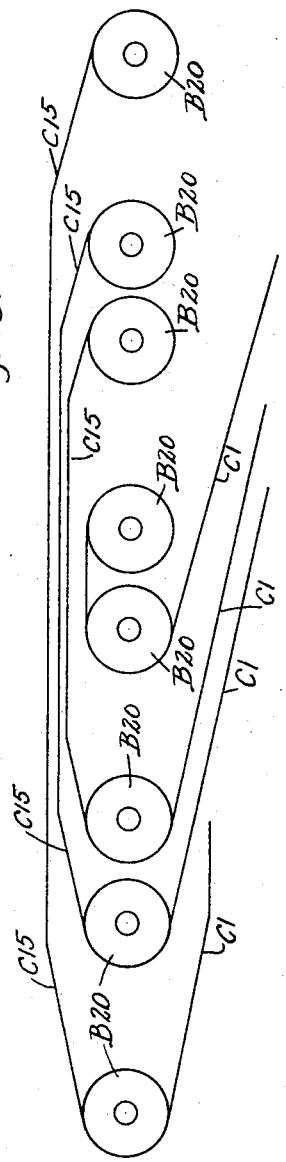
WITNESSES
INVENTOR
James B. Lee
By Cyrus Kehr
Attorney

UNITED STATES PATENT OFFICE.

JAMES B. LEE, OF SAVANNAH, GEORGIA.

ELECTRIC LIGHTING.

1,198,857. Specification of Letters Patent. Patented Sept. 19, 1916.

Application filed March 7, 1910, Serial No. 547,803. Renewed February 16, 1916. Serial No. 78,785.

*To all whom it may concern:*

Be it known that I, JAMES B. LEE, a citizen of the United States, residing at Savannah, in the county of Chatham and State of Georgia, have invented a new and useful Improvement in Electric Lighting, of which the following is a specification, reference being had to the accompanying drawing.

My improvement relates to electric lighting apparatus in which a plurality of electric lamps are arranged near each other to form a "light field" any portion of which may be illuminated for the forming of a letter, figure, picture, arbitrary sign, or other representation, such lamps being connected by electrical conductors with circuit-closing mechanism for manually or automatically and temporarily closing the circuits for the lamps standing in proper position to form such letter, figure, picture, sign, or other representation.

The lamps may be arranged in a single field for successively presenting only one such character or representation, or there may be a plurality of such fields arranged adjacent each other in the range of vision of a person at a suitable distance, and so that a number of representations may be simultaneously made, one in each of said fields. In the drawings hereinafter described a plurality of such fields are shown, each being formed within a rectangular frame, so that at the same time the various letters of a word or a succession of words may be presented, one letter in each field.

The circuit-closing mechanism is adapted for automatic operation for the rapid successive forming of a large number of letters or words or other representations, the circuit-closing mechanism being set in what may be termed, magazine form, for the successive production of such characters or representations.

The circuit-closing mechanism comprises a member provided with a plurality of contact lines, the contact places of each line conforming to the lamps to be illuminated for the forming of one of the characters or representations which is to be produced by the corresponding light field, and there is a group of brushes corresponding to the number of lamps in the field to which said circuit-closing apparatus is applied. Said contact member and said brushes are relatively movable toward and from each other, or in a direction transverse to the face of said contact member, for the making and breaking of engagement between said brushes and said contact places, and also in a direction parallel to the face of said contact member for bringing different contact lines opposite said group of brushes. And there is a mechanism for effecting this last-mentioned movement; and acting in opposition to such moving mechanism is a stop mechanism comprising a stop form adapted to limit said moving mechanism to various distances adapted to bring any one of the various contact lines and the group of brushes opposite each other. Other mechanism is used for effecting the movement of said contact member and said group of brushes relatively toward and from each other.

In the accompanying drawings, Figure 1 is an elevation showing a light field arranged in a frame and showing alongside of said frame four other smilar frames each adapted to receive one light field; Fig. 2 is a plan of the apparatus shown by Fig. 1; Fig. 3 is an upright section on the line 3—3 of Fig. 1, looking toward the left; Fig. 4 is a section on the line 4—4 of Fig. 3, looking toward the left; Fig. 5 is a sectional view of one of the circuit-closing cylinders and the housing for such cylinder; Fig. 5ª is a section on the line 5ª—5ª of Fig. 5; Fig. 5ᵇ is a horizontal section just above the cylinder in Fig. 5; Fig. 6 is a section on the line 6—6 of Fig. 5; Fig. 6ª is a section on the line 6ª—6ª of Fig. 6; Fig. 6ᵇ is an enlarged detail view taken from Fig. 6; Fig. 7 is a section on the line 7—7 of Fig. 5; Fig. 7ª is a section on the line 7ª—7ª of Fig. 5; Fig. 8 is a side elevation of the apparatus used for turning the contact cylinder in its forward direction; Fig. 9 is a plan of a portion of the apparatus shown in Fig. 8; Fig. 9ª is a section on the line 9ª—9ª of Fig. 9, looking toward the left; Fig. 10 is a plan of the apparatus in the lower left hand portion of Fig. 8; Fig. 11 is a side elevation of a stop-form carrying belt and mechanism for supporting said belt; Fig. 12 is another elevation of the same mechanism; Figs. 13 and 14 are details of the hinge by which the sections of said belt are joined to each other; Figs. 15, 16, and 17 are detail views illustrating one of the stop bar holders; Fig. 18 is a plan of one of the stop bars, a portion being broken away; Fig. 19 is a section on the line 19—19 of Fig. 18; Fig. 20 is a detail view of a portion of the stop form escapement mechanism; Fig. 21 is a detail sectional elevation of an auxiliary apparatus; Fig. 21ª is a rear elevation of a switch shown in Fig. 21; Fig. 22 is a sectional plan of the apparatus shown in Fig. 21; Figs. 23, 24, 25, and 26 illustrate a modification of the contact mechanism; Fig. 27 is a transverse section of one form of the contact cylinder; and Fig. 28 is a diagrammatic view showing the manner of transmitting power to the contact cylinders.

Referring first to Figs. 1, 2, 3, and 4, A is a light field, one such field being in elevation in the left hand portion of Fig. 1, ten such fields being in plan in Fig. 2, two being in upright section in Fig. 3, and one being shown in rear elevation in Fig. 4. In Fig. 1 are four frames located horizontally in line with the field, A, and each adapted to receive such a field, thus placing five such fields in horizontal alinement, each adapted for the forming of one letter in a word of five letters, if such fields are used for representing letters. If such fields are used for pictorial representation, each field may be used for a distinct pictorial representation, or each of the several fields may be used to form a portion of a larger pictorial representation.

The frames shown by Figs. 1 to 4, inclusive, are double, two frames being opposite and parallel to each other and joined to each other by cross bars, $A^{12}$, and each frame being adapted to support a light field facing away from the light field supported by the other such frame. Said frames are duplicates, and the light fields are duplicates. Hence a description of one such frame and the light field supported thereby and the mechanisms for operating such field will serve as a description of all the frames and light fields, excepting that it must be pointed out how a portion of such mechanisms are operatively connected with a plurality of the fields. Each such frame is designated by $A^1$ and is shown rectangular and having elbows, $A^2$, at the corners. In the form shown in the drawings, the width of the frame is to the length thereof as 5 is to 7. This permits dividing the space within said frame into five upright rows and seven horizontal rows of square compartments, $A^3$. These compartments are in the form of truncated, four-sided pyramids, the base being directed toward the front and there being an opening at the rear—in the plane of truncation, so that wind may pass through each of said compartments, to reduce wind strain on the apparatus. The walls $A^4$, of said compartments are preferably formed of sheet metal and the meeting edges of adjacent compartments joined to each other in any suitable manner, as by means of soldering, so that the entire group of compartments become a single body, as would be the case if an equal number of square tin pans having sloping sides were in this manner joined to each other. Certain of these compartments are preferably subdivided as shown by the drawings, wherein each compartment in the four corners of the frame or field is divided by a partition, $A^5$, extending obliquely from the adjacent end edge to the adjacent side edge of the field, and each of the middle compartments in the four outer rows of compartments is divided by two partitions crossing each other at right angles and extending to the corners of the compartment, thus forming in each such compartment four sub-compartments. The walls of these compartments perform two functions, first to limit the lateral range of the illumination and thus aid in giving a definite margin to the figure or character to be formed, and, second, to reflect the light forward approximately perpendicularly away from said field.

The group of compartments may be secured to the frame in a variety of ways. The drawings show, for this purpose, upright and horizontal stay wires, $A^7$, having their ends bent around the frame, $A^1$, and lying against the outer faces of the walls, $A^4$, of the compartments and secured to said faces by any suitable means, as, for example, soldering (see Figs. 3 and 4). This construction brings such a wire against each outer face of each such compartment and brings said compartments into the plane of the frame, a portion of each compartment being forward and a portion being rearward of said plane (see Fig. 4).

Into each compartment and sub-compartment is placed an incandescent electric lamp, $A^8$, the base thereof being in or rearward of the rear opening of the compartment or sub-compartment, such rear opening being, preferably, larger than the base of the lamp so that a passage for air is left around the lamp.

The lamps, $A^8$, are secured to lamp-supporting bars, $A^9$, placed upright behind and opposite and at a short distance from each upright row of compartments and having their ends secured to binding members, $A^{10}$, which members are also secured to the frame, $A^1$. Said bars are enlarged where they receive the lamps of the sub-divided compartments.

Individual current-conducting wires, $A^{11}$, lead to the lamps, as shown diagrammatically in the right hand portion of Fig. 3. Said wires extend to brushes, $B^1$, which are arranged to bear upon an upright, insulated, metallic, circuit-closing cylinder, B, having an upright axle, $B^3$, having bearings in the top plate, $B^{10}$, and the bottom plate, $B^{11}$, the top plate, $B^{10}$, being supported on four upright columns, $B^{15}$, and said columns resting on the bottom plate, $B^{11}$, and the latter having extension plates, $B^{16}$, resting on the upper frame cross bars, $A^{12}$, and secured to said bars by U-shape binding members, $B^{17}$. (See Figs. 5, 6, 7, and 7ª.) Said brushes are arranged in a row parallel to and adapted to bear upon the surface of the cylinder. A brush, $B^2$, is mounted upon the bottom plate, $B^{11}$, and arranged to bear upon the axle, $B^3$, of the cylinder, B, (see Figs. 5 and 7); and a lighting current wire, $A^{13}$, leads from any source of generation of said current to said brush. From the foregoing it will be understood that when any one of the brushes, $B^1$, is in contact with the cylinder, current will flow through the corresponding lamp, $A^8$, and cause the illumination of the same. Said cylinder is adapted for rotation to bring different longitudinal portions of its surface opposite the brushes, $B^1$, provision being made, as will hereinafter appear, for placing said cylinder at rest in arbitrarily chosen portions of one complete rotation, such portions being equal in number to the number of letters in the alphabet plus any other characters to be used in operating the apparatus (if the apparatus is to be a reading sign). To make up one representation in the light field, the brushes, $B^1$, in communication with the lamps which must be illuminated for making such representation are to be placed in electrical contact with said cylinder. In the form shown in the drawings, the brushes are so supported as to normally stand away from the face of the cylinder; and the cylinder is formed with apertures or slots, $B^5$, into which the brushes may extend without making contact. (Fig. 5). The face of the cylinder is formed with such slots or apertures in proper positions to come opposite all of the brushes communicating with lamps which are to remain dark. This involves the placing of such apertures or slots grouped in rows parallel to the cylinder axis, the group in each row corresponding to the lamps which are to remain dark during a given representation in the light field.

In the light field shown in Fig. 1, there are fifty-one lamps, and this calls for fifty-one brushes, $B^1$, and fifty-one spaces in each contact line in which there may be (if needed) an aperture for avoiding contact of the corresponding brush, in order that the corresponding lamp may remain dark.

Means are provided for allowing all the brushes, $B^1$, to simultaneously move away from the cylinder during each partial rotation of the latter, this being done for the purpose of avoiding friction by the pressure of said brushes upon the surface of the cylinder during such rotation. But before the brushes move away from the cylinder, a main switch on the wire, $A^{13}$, is opened, as hereinafter described. By first breaking the circuit by the opening of the main switch, arcing at the brushes, when the latter leave the cylinder, is avoided. (Figs. 8 and 10).

All the brushes, $B^1$, are flexible and are mounted by one end upon an upright bar, $B^6$, while the other end extends toward the surface of the cylinder. Between its ends each brush extends through an elongated groove, $B^7$, in a deflecting bar, $B^8$, said groove being on one edge of said bar, and said bar being hinged on a line extending along its other edge. Said hinge is formed by means of an upright shaft, $B^9$, extending by its upper end into the top plate, $B^{10}$, above the cylinder and through the bottom plate, $B^{11}$, below the cylinder, and having shoulders, $B^{12}$, bearing against said plates to hold said shaft against endwise movement. On the lower end of said shaft, below said bottom plate, is a rigid arm, $B^{13}$, to which is connected a horizontal draft or tension wire, $B^{14}$. By drawing said wire toward the right, as seen in Figs. 7 and 7ª, said arm is moved through a limited portion of its circle for pressing the brushes, $B^1$, against the cylinder. Said wire is connected to all the arms, $B^{13}$, of the same row of light fields. And a contracting coiled spring, $B^{22}$, is applied to the arm, $B^{13}$, for drawing said arm toward the left, as viewed in Fig. 7ª, when pulling on the wire, $B^{14}$, ceases. (Figs. 5 to 7ª, inclusive).

A main current wire, $A^{13}$, leads from any electric generator (not shown) to the brush, $B^2$, and short return current wires, $A^{14}$, lead from each lamp to the common return current wire, $A^{15}$, which latter leads to said generator.

An upright housing, $B^{18}$, extends around the top plate, $B^{10}$, columns, $B^{15}$, and bottom plate, $B^{11}$, and rests with its lower edge upon said extensions, $B^{16}$. The function of said housing is to exclude rain, snow, dust, etc., from the cylinder, B, and the operative parts associated therewith. (Figs. 5 to 7, inclusive). Said cylinder, B, has a normal or initial position of rest. In other words, after each movement into a position for closing the lamp circuits to make a chosen representation in the light field, the cylinder rotates backward to occupy the position from which it started. For this purpose a stop arm, $B^{24}$, carried by the upper portion of the cylinder bears against the shaft, $B^9$. (See Fig. 5ᵇ). And while the cylinder is in this position, all of the brushes, $B^1$, are to remain out of contact with the cylinder, in order that the entire light field for that cylinder may be dark. For this purpose slots, $B^5$, are formed in said contact line opposite all of said brushes. Then, when a representation comprising several words is to be made, spaces may be formed between the words by leaving the appropriate cylinders stand at the initial position during the representation. Provision is made for this in the stop forms hereinafter described. The cylinder is returned to such initial position by means of the coiled spring, $B^{19}$, one end of which is applied to the upper portion of said cylinder while the other end is applied to a post, $b^{10}$, on the top plate, $B^{10}$.

For convenience in description, movement of the contact cylinder away from the initial or normal position will be herein regarded as forward movement, while movement toward said position is regarded as rearward or backward movement, and movement along or in the direction of the mechanism from the cylinder to the stop forms is regarded as forward movement while movement in the opposite direction is regarded as rearward or backward movement.

The cylinder, B, is turned forward by the rotation of the grooved wheel, $B^{20}$, fixed on the lower end of the axle, $B^3$, (Figs. 5 and 7a). The forward rotation of said wheel is effected by drawing or pulling a cord, $C^1$, or similar windable member away from said wheel (forward), one end of said cord being secured to and wound around said wheel and the other end of said cord being secured to and wound around a similar grooved wheel, $C^2$, (Figs. 8 and 9). At the side of and rigid with the wheel, $C^2$, is a smaller grooved wheel, $C^3$. A cord, $C^4$, is secured to and extends around the wheel, $C^3$, and has its opposite or forward end secured to a standard, $C^5$, on the piston rod, $C^6$. Said rod rests in a stationary guide, $C^7$, and extends into a cylinder, $C^8$, in the direction of the wheel, $C^3$, and is there joined to a piston, $C^9$, so that driving said piston outward in the cylinder will cause said standard, $C^5$, to move away from the wheel, $C^3$. Said cylinder, piston, and piston rod constitute a fluid pressure or pneumatic motor. From the foregoing it will be seen that when said piston and piston rod are driven forward, the standard, $C^5$, is made to travel forward away from the wheel, $C^3$, thereby pulling on the cord, $C^4$, and unwinding it from the wheel, $C^3$, and thereby compelling the rotation of said wheel and the wheel, $C^2$. This results in drawing the cord, $C^1$, and causing the latter to force the forward rotation of the grooved wheel, $B^{20}$, and the cylinder, B. The piston, $C^9$, is driven forward by fluid pressure, as by means of air coming from any suitable source of supply of compressed air through the pipes, $C^{11}$ and $C^{10}$, the flow of such air being controlled and timed as will be hereinafter described. For the present, let us note that the action of said compressed air is adapted to drive the piston forward (away from the wheel, $C^3$, and toward the piston rod guide, $C^7$) until the piston abuts against the stop form hereinafter described. The wheels, $C^2$ and $C^3$, being of different diameters, constitute a speed changing device for changing the speed transmitted from the piston rod, $C^6$. By arbitrarily limiting or stopping the piston rod at various stages of its range of movement, the train of members between the piston rod and the cylinder, B, and said cylinder, $C^8$, may be correspondingly limited or stopped, the object being the stopping of said cylinder, B, in such various positions—positions suited to bringing different cylinder contact lines opposite the brushes, $B^1$.

The rotary cylinder, B, with its plurality of contact lines, is a shiftable, multiple, contact member coöperating with the group of brushes in the making and breaking of the individual lamp circuits, advance and reverse movements in two courses being involved in the performance of the function of said contact member and group of brushes in a direction transverse to the face of said contact member and the other of said movements being a relative movement of said contact member and group of brushes parallel to the face of said contact member, the former advance movement serving to separate the contact member and the group of brushes from each other and the latter advance movement being a relative shifting of the contact member and the group of brushes from the initial position or positions of rest to a position bringing a chosen contact line opposite the group of brushes.

Each reverse movement is in the same course as the corresponding advance movement, but in the opposite direction. And said parallel advance movement is effected by said fluid-pressure motor; and that is the only function performed by said motor. It may be said that the function of said motor is to effect relative adjustment of said contact member and group of brushes parallel to the face of the contact member. As already herein described, the reverse movement of the cylinder is effected by the spiral spring, $B^{19}$.

The means (the stop forms) employed for arbitrarily limiting the forward movement of the piston rod in response to the air pressure will be next described. But before entering upon such description, let it be noted that each of a series of light fields used for a simultaneous representation is provided with such a cylinder and train of members leading to a similar piston rod and that such piston rod and its cylinder preferably rest parallel to the piston rod and cylinder already described, the outer ends of such piston rods being preferably in the same plane, so that a corresponding number of limiting or stop devices for such piston rods may be placed closely to and in alinement with each other. To facilitate the bringing of the piston rods closely together, the cylinders are "staggered"—placed alternately into two parallel planes, whereby the group of cylinders is made to occupy less lateral space (see Fig. 9ª), while a portion of the piston rods are off-set to bring the outer ends of all into the same plane.

Referring now to Figs. 11 and 12, D is an endless belt or chain supported upon two polygonal wheels, D¹, said wheels being rigid on a shaft, D², resting in stationary bearings, D³. Said belt is composed of links or sections, D⁴, which are hinged to each other and are of the same length as the distance between the corners or angles of the wheels, D¹ so that while the belt rests by its weight upon said wheels, the sections extending over said wheels will make positive engagement with the wheels for the driving of the belt when the wheels are rotated.

On the shaft, D², is a drum, D⁵, upon which is wound one end of a cord or rope, D⁶, and a weight, D⁷, is secured to the other end of said rope. The winding of the rope around said drum is in the proper direction to secure rotation clockwise as viewed in Fig. 11, so that the portion of the belt at the left, in said figure, will travel upward when said weight and said cord travel downward. In operation, said weight constantly pulls downward for such rotation is permitted and resisted alternately by two members which move into and out of the path of members on the belt, such action being similar to the action of the escapement mechanism on a typewriter carriage, and the movement of the belt, D, resembles the movement of a typewriter carriage; that is to say, the belt is moved a short interval and then held stationary, and then moved another short interval and again held stationary, and so on indefinitely, but not beyond the full unwinding of the cord or rope, D⁶, from the drum, D⁵.

The chain or belt sections, D⁴, are all alike. Hence a description of one will serve as a description of all. Each such section consists of a flat rectangular plate having uniform thickness and plane faces (see Figs. 11, 12, 13, 14, 9, and 8). The meeting edges are hinged to each other by means of ear plates, D⁸, and a pintle, D⁹, the ear plates being countersunk as shown in Fig. 14 and secured by screws, D¹⁰, the meeting inner corners of the section being cut away sufficiently to form a channel to receive the pintle. Each such section has four transverse holes, D¹¹, to receive bolts or screws, E¹, from the stop holder, E, said holder being placed flatwise against the outer face of the section, and said bolts receiving nuts, E², at the rear of said section. One such holder is secured to each section and is of the same dimensions horizontally and vertically as such section, so that each such holder extends closely to the next holder above and below. And around its lower and side edges, said holder has walls, E⁴, perpendicular to its rear wall, E³. Each bottom wall, E⁴, has two series of screw-threaded apertures, E⁵. Each such aperture is deepened by raising the metal around it, as shown in Fig. 15. When the sections pass around the wheels, D¹, the nuts, E², pass between said wheels and prevent lateral movement of the belt. The holders being thus close together and provided with only one transverse wall (the bottom wall, E⁴), the space within each holder is separated from the space within the next holder, either above or below, by only the thickness of one such bottom wall, E⁴; and since said holder is made of sheet metal, such wall may be thin, as indicated by the drawings.

The dimensions of the chain or belt sections, D⁴, depend upon the size of the holders, E, and the latter size depends upon the number and size of stop bars, E⁶, to be used. Such number and size may be varied, as will hereinafter appear. Said stop bars are rectangular in cross section, and the cross sectional dimensions and the interior dimensions of the holder, E, are such as to cause a certain number of said bars laid horizontally across the bottom to completely fill the space between the upright walls, E⁴, and to cause a certain number of said bars laid upon each other to completely fill the interior of the holder from the bottom wall thereof to the bottom wall of the next holder—in other words, be flush with the upper edges of the holder. Each such stop bar is provided with two upright apertures, E⁷, in proper positions to receive the screw-bolts, E⁹, and around each aperture is a countersink, E⁸, adapted to receive the head, E¹⁰, of any such screw-bolt or the raised portion of the bottom wall around the screw-threaded apertures, E⁵. The apertures, E⁷, in said stop bars are spaced to bring them into alinement with each other and with the apertures, E⁵, when said bars are placed upon each other in horizontal and upright rows to the full capacity of the holder, E. When said bars are so placed, two screw-bolts are driven downward through each upright row of stop bars and screwed into the screw-threaded bottom wall, E⁴, the heads of said bolts entering the countersinks in the upper stop bars, and making said heads and the upper faces of said stop bars flush with the upper edges of the holder.

The position of the belt is such as to bring each upright row of stop bars opposite one of the piston rods, C⁶. Thus any horizontal row or bank of stop bars may be brought horizontally opposite the horizontal row or bank of piston rods, so that when said piston rods are driven forward, each will continue to move until it abuts against the end of one of the stop bars.

As hereinbefore described, each piston rod controls one light field. Hence the series of light fields represented by the horizontal row of piston rods will be illuminated according to the forward movements of the piston rods permitted by the horizontal row of stop bars at the time resting opposite said piston rods. In other words, the extent of rotation of any circuit-closing cylinder, B, during any representation, depends upon the length of the stop bar at the time standing in front of the corresponding piston rod.

Assuming that the representations in the light fields are to be letters of the alphabet, the stop bars are made in twenty-seven graduated lengths, the longest bar being long enough to prevent forward movement of the adjacent piston rod far enough to turn the cylinder away from the initial position—the position for leaving the corresponding light field dark. For the letter, A, of the alphabet, the stop bar is short enough to permit movement of the cylinder far enough to bring the contact line for said letter opposite the row of brushes, $B^1$. To cause illumination in the light field to make the alphabet letter, B, a stop bar is used short enough to permit the rotation of the cylinder far enough to bring the second contact line of the cylinder behind the row of brushes. This is the arrangement, if the apparatus is organized for placing contact lines of the letters of the alphabet in regular order on the contact cylinder (A, B, C, D, E, etc.); but, it will be understood that the alphabet might be reversed, the contact line for the letter, Z, being placed first. And it will also be understood that the contact lines for the letters of the alphabet need not be in series on the contact cylinder, but that the arrangement of the letters may be made arbitrarily as they are in a typewriter keyboard and in the printer's case.

The unit of difference in the lengths of the stop bars may be an eighth of an inch, a quarter of an inch, or any other arbitrarily chosen length; but it will be understood that a proper relation of dimensions must be established through the train of devices from said stop bars to and through the contact cylinder. And it is to be noted that, inasmuch as the wheel, $C^2$, is larger than the wheel, $C^3$, the cord, $C^1$, will move farther than the corresponding piston rod moves. Hence a given variation in the lengths of the stop bars will lead to a relatively larger interval between stops in the contact cylinder. This increase in movement is recommended because it allows the use of shorter stop bars in the stop bar forms.

The portion of the belt opposite the row or bank of piston rods extends through an upright guide, F, consisting of a back, $F^1$, located a little way rearward of the adjacent belt section, and a forward-directed side piece, $F^2$, at each side of said back, and a flange, $F^3$, on each of said side pieces, each such flange being directed toward the other. The side pieces are wide enough to bring said flanges forward of the front face of the adjacent belt section. The back, $F^1$, is wide enough to bring the side pieces, $F^2$, far enough from the edges of the belt section to leave room for teeth, $D^{12}$, on the side edges of the belt section, $D^4$. In each rear corner of the guide, F, is a block, $F^4$, which bears against the rear face of the belt section, while the rear faces of the flanges, $F^3$, bear against the front faces of the teeth $D^{12}$. In this way forward and rearward movement of the belt section is prevented. The inner edges of the flanges, $F^3$, bear against the upright walls of the stop holder, E, and prevent lateral movement of the belt section. Furthermore, the front portion of each corner block, $F^4$, is shown extending a little way forward between the adjacent edge of the belt section and the adjacent side piece, $F^2$, of the guide, F, whereby a second means is afforded for preventing lateral movement of the belt section. The teeth, $D^{12}$, are spaced the same as the upright spacing of the stop bars, $E^6$. The upper faces of said teeth are horizontal, while their lower faces are oblique, slanting downward from the rear toward the front. (Figs. 9, 11, 12, and 13).

Below the guide, F, and at each side of the belt are two horizontal bearings, $G^1$, perpendicular to the belt. In said bearings rests a rock shaft, $G^2$, on the forward end of which is a crank-form hook or dog, $G^3$, which is adapted to enter the space between two of the teeth, $D^{12}$, and prevent the upward or downward movement of the adjacent belt section. Said hook or dog may be freed from said teeth by partially rotating said rock shaft so as to move said hook or dog outward away from said belt section. At its opposite end, said shaft has a rigid arm, $G^4$, extending toward the path of a cam, $G^5$, on the reciprocatory bar, $G^6$, which is located a little way above the rock shaft, $G^2$—far enough to bring the forward end of said bar a little above the upper portion of the hook or dog, $G^3$.

At its rear end, each of the bars, $G^6$, is secured rigidly to a transverse rock shaft, $G^7$, resting in slide blocks, $G^8$, which are guided on horizontal fixed rails, $G^9$, supported by any suitable stationary means, not shown. Above each bar, $G^6$, is a horizontal pin, $G^{10}$, and below each such bar is a similar pin, $G^{11}$. Said pins are supported by fixed upright posts, $G^{12}$, (see Fig. 9). The distance between adjacent pins, $G^{10}$ and $G^{11}$, is sufficient to allow a limited up and down movement for the bars, $G^6$.

Above the pins, $G^{11}$, each bar, $G^6$, has a cam face, $G^{13}$, sloping downward from the front toward the rear and so positioned as to bring the highest portion of said cam face above said pin when said bar is at its rearward limit. Said cams have the effect of causing the lifting of the free or forward ends of said bars when the latter are pushed forward. The pins, $G^{10}$, serve to limit the upward movement of said bars, $G^6$. The forward end of each of said bars has an upward-directed, sloping cam face, $G^{14}$, adapted to bear against the lower face of the adjacent tooth, $D^{12}$, when said bar is driven forward, thereby forcing said tooth upward (if it does not move upward by the action of the weight, $D^7$). And said lifting action is augmented by the upward movement of the forward end of said bar by the action of the cam, $G^{13}$, on the pin, $G^{11}$. The bars, $G^6$, and the hook or dog, $G^3$, are arranged to alternate their engagement of the teeth, $D^{12}$, each entering into the path of the next lower tooth just before the other moves out of such path (Fig. 12).

Coupled to the middle of the rock-shaft, $G^7$, is a piston rod, $G^{15}$, extending rearward to a piston, $G^{16}$, in a cylinder, $G^{17}$. By the reciprocation of said piston in said cylinder, said rock-shaft and the sliding blocks, $G^8$, are driven forward by air entering the cylinder through the pipe, $G^{18}$, which is connected with the pipe, $C^{11}$, (Fig. 8), the pipe from which the pipe, $C^{10}$, conducts air to the air cylinder, $C^8$. Contracting coiled springs, $G^{19}$, joined by their rear ends to said cylinder and by their forward ends to the rock-shaft, $G^7$, automatically draw said group of parts rearward when the air in said cylinder has been released.

A spiral spring, $G^{20}$, surrounds the rock-shaft, $G^2$, and has one end secured to said shaft and the other end to one of the bearings, $G^1$, in such manner as to normally turn said shaft for pressing the hook or dog, $G^3$, toward the teeth, $D^{12}$, and to press the arm, $G^4$, toward the bar, $G^6$, and the cam, $G^5$, on said bar. A screw, $G^{21}$, extends horizontally through the upper end of the arm, $G^4$, and is adapted to be engaged by the cam, $G^5$, when the latter moves forward (toward the belt).

When the bars, $G^6$, begin to move forward, the cams, $G^5$, bear sidewise against the ends of the screw, $G^{21}$, and force the latter outward, whereby the rock-shafts, $G^2$, are turned enough to draw the dogs, $G^3$, out of the paths of the teeth, $D^{12}$. But during such forward movement, as already described, the bars, $G^6$, are moved upward by the action of the cam faces, $G^{13}$, on the pins, $G^{11}$, so that the cams, $G^5$, are raised above the free ends of the screw, $G^{21}$, allowing each screw, the arm, $G^4$, and dog, $G^3$, to move toward the adjacent bar and the teeth, $D^{12}$, through the action of the spiral spring, $G^{20}$, said dog then bearing against the adjacent tooth, $D^{12}$, during the upward movement of said tooth, until said tooth has been passed. (See Figs. 8, 9, and 20.) Then, by the action of said spiral spring, said dog is driven into the space between said tooth and the next lower tooth. While the bars, $B^6$, are being again moved rearward, the forward end of each bar, $G^6$, rests upon the upper face of the tooth next below the one last previously engaged, until the bar has been drawn rearward far enough to slip from said lower tooth. By that time, the cam, $G^5$, is far enough rearward to clear the screw, $G^{21}$, and drop down behind said screw.

I will turn next to a description of the mechanism used for controlling the flow of compressed air through the pipes, $C^{10}$ and $G^{18}$. Adjacent the junction of the pipes, $C^{10}$ and $G^{18}$, with the pipe, $C^{11}$, is an upright worm gear wheel, $H^1$, mounted on a horizontal shaft, $H^2$, resting in bearings, $H^3$. The periphery of said wheel is engaged by a worm shaft, $H^4$, which, in the form shown in the drawings, is a continuation of the shaft or axle of the electric motor, $H^5$. When said motor is in operation, said shaft is rotated so as to rotate said wheel contraclockwise, as viewed in Fig. 8. On one side of the worm gear wheel, $H^1$, is a stud or pin, $H^6$, which is carried in a circular orbital path by the rotation of said wheel, one portion of said path being adjacent the junction of the pipes, $C^{10}$ and $G^{18}$, with the pipe $C^{11}$. At a little distance above said junction, a vented cut-off valve, $C^{12}$, is located in the pipe, $C^{10}$, and at about the same distance below said junction is a similar valve, $G^{22}$. On the plug of the valve, $C^{12}$, is a rigid arm, $C^{13}$, extending into the path of said stud or pin, $H^6$; and on the plug of the valve, $G^{22}$, is a similar arm, $G^{23}$, also extending into the path of said pin, said last mentioned arm being farther from the worm gear wheel, $H^1$, than is the arm, $C^{13}$, so as to allow the arm, $G^{23}$, to overlap the arm, $C^{13}$, to the end that both of said arms may, at times, rest against the stud or pin, $H^6$. A contracting coiled spring, $C^{14}$, is coupled to the arm, $C^{13}$, to draw the latter upward, and a similar contracting coiled spring, $G^{24}$, is similarly connected to the arm, $G^{23}$. The plugs of said valves and said arms are arranged to limit the upward movement of the free ends of said arms so as to prevent said ends from moving upward out of the orbital path of said pin, $H^6$, in order that said pin may, when approaching said valves, pass above said ends of said arms and, upon further movement, bear said arms downward.

The relation of the plug in the valve, $C^{12}$, to the arm, $C^{13}$, is such as to cause the opening of the valve when the arm is in the raised position, as shown in Fig. 8, so that air may pass from the pipe, $C^{11}$, through the pipe, $C^{10}$, and into the cylinder, $C^8$. Hence pressing said arm downward will cut off said air supply and vent the air from the cylinders, $C^8$. The forward movement of the pin, $H^6$, will drive said arm downward until said pin slips over the free end of said arm. This makes an interval during which all the piston rods and pistons are drawn rearward in the cylinders, $C^8$. During such interval the stop-form belt escapement or shifting mechanism, comprising the dog, $G^3$, and the bar, $G^6$, is to be operated by the opening of the valve, $G^{22}$, in the pipe, $G^{18}$, said valve being closed when the arm, $G^{23}$, stands in the normal or raised position, as shown in Fig. 8. The opening of said valve is effected by the engagement of the pin, $H^6$, with said arm, such engagement being so timed as to take place shortly after the engagement of said pin with the arm, $C^{13}$, the interval between the closing of the valve, $C^{12}$, and the opening of the valve, $G^{22}$, being sufficient to permit the venting of the air cylinders, $C^8$, and the return of the pistons in said cylinders to their rearward or normal position. As will be seen from an inspection of Fig. 8, the engagement of the arm, $G^{23}$, by the pin $H^6$, is continued during a short interval after the arm, $C^{13}$, has been released. But the arm, $C^{13}$, must not be released until the lower valve has been opened long enough to allow the air to pass through the pipe, $G^{18}$, and drive the bars, $G^6$, forward into engagement with the adjacent teeth of the belt, $D$; for the then retracted piston rods must not be allowed to again approach the belt until the adjacent portion of the latter has been shifted one step upward. Otherwise some of said piston rods would obstruct the upward movement of some of the stop bars. After its release the arm, $G^{23}$, rises, in response to the action of the spring, $G^{24}$, and again cuts off and vents the air from the cylinder, $G^{17}$, so that the bars, $G^6$, may be again drawn away from the belt by the action of the contracting coiled springs, $G^{19}$, the dog, $G^3$, having entered between two of the teeth, $D^{12}$, when the bars, $G^6$, reached their forward limit—their full entrance between the teeth, $D^{12}$.

As already herein indicated, the brushes $B^1$, are to be moved away from the circuit-closing cylinder, $B$, during each partial rotation of said cylinder; and the deflecting bar, $B^8$, has been described as properly connected with said brushes for such purpose; and it has been described that the tension wire, $B^{14}$, is connected with the arm, $B^{13}$, for turning said deflecting bar. For drawing said wire in the proper direction to cause said deflecting bar to move away from said cylinder and allow said brushes to spring away from said cylinder, said wire is suitably guided to a point adjacent the worm gear wheel, $H^1$, (there passing over a grooved guide pulley, $B^{21}$,) to one end of a pawl, $H^7$, pivoted to a fixed support, $H^8$, and adapted to bear upon a cam wheel, $H^9$, having a recess, $H^{10}$, into which said pawl may drop during the rotation of said cam wheel, said wheel surrounding the shaft, $H^2$. When said pawl rests in said notch, its opposite end is raised so as to allow the movement of the wire, $B^{14}$, toward the arm, $B^{13}$, and the contracting coiled spring, $B^{22}$, at the extreme end of the wire, $B^{14}$, draws said wire in said direction and causes the latter to draw the arm, $B^{13}$, in the proper direction to move the deflecting bar, $B^8$, away from the cylinder, $B$, allowing the brushes, $B^1$, to spring outward away from said cylinder. Upon the further rotation of the cam wheel, $H^9$, so as to bring the recess, $H^{10}$, away from said pawl, the latter is forced upward, whereby its opposite end is forced downward, drawing the wire, $B^{14}$, in the proper direction to turn the arm, $B^{13}$, in the reverse direction, so as to turn the deflecting bar toward the cylinder, $B$, for pressing the brushes against the cylinder. It will be observed that the interval during which the recess, $B^{10}$, controls the pawl is short compared with the interval during which the main portion of the cam wheel, $H^9$, controls said pawl. Hence the period of illumination of the light fields is long in comparison with the period of darkness. Said period of darkness should begin a little in advance of the movement of the piston rods $C^6$, away from the stop bars and should continue until said piston rods have again been returned into engagement with the stop bars.

Below the outer end of the pawl, $H^7$, (Figs. 8 and 10) are two stationary switch contact plates, $H^{11}$, secured to the ends formed by a break in the current wire, $A^{13}$, leading from the generator to the axle brush, $B^2$. Opposite said plates, $H^{11}$, are two similar plates, $H^{12}$, joined to the ends formed by making a break in the return current wire, $A^{15}$. Attached to said pawl above said plates is an insulation block, $H^{13}$, on one side of which is a metallic conductor plate, $H^{14}$, adapted to make contact with the switch plates, $H^{11}$, and on the other side of said insulation block is a conductor plate, $H^{15}$, adapted to make contact with the switch plates, $H^{12}$. These members constitute the main switch, already mentioned, for breaking the circuit before the brushes, $B^1$, are moved away from the cylinder, $B$. When said end of said pawl goes down, the conductor plates are put into contact with the adjacent switch plates and the circuit is completed. Said end of the pawl is driven downward when the opposite end of the pawl is forced upward out of the recess, $H^{10}$, of the cam wheel, $H^9$, and the switch thus formed remains closed until the cam wheel has made one rotation and again allows the pawl to drop into said recess. It will be observed that the wall adjacent which the pawl enters said recess is radial to the axis of said cam wheel, so that said pawl may drop into said recess quickly, in order that arcing at the switch may be avoided when it is being opened. After the breaking of the contacts at the above described main switch there is no more current to pass from the cylinder, B, to the brushes, $B^1$, and said brushes may then be allowed to move out of contact with the cylinder without arcing. It is desirable that such arcing be avoided, and the apparatus described is adapted to insure the breaking of the current a little in advance of the separation of said brushes from the cylinder; for the circuit is broken at the switch upon the first lifting of that end of the pawl, and this occurs before sufficient reverse movement is allowed to the tension wire, $B^{14}$, to allow the release of the brushes through the turning of the deflecting bar, $B^8$. And when the circuit is again to be closed for illuminating the light field, the wire, $B^{14}$, must move in the opposite direction for the setting of the brushes into engagement with the contact cylinder by the time the switch end of the pawl has descended far enough to cause contact between the switch plates. This action can be facilitated by utilizing the elasticity of the wire, $B^{14}$, and of the brushes.

Referring now to Figs. 8 and 21 and 22, I will next describe an auxiliary portion of my apparatus, the function of which auxiliary apparatus is to make a supplemental representation in a light field or fields (duplicates of the fields shown by Figs. 1, 2 and 3) during an interval in which a plurality of representations are made in the main light field or fields. For example, the series or row of light fields already described may be used for representing reading matter, line by line, relating to a certain subject, and the auxiliary field or fields may be used to present the subject of such reading matter, said subject disappearing when the matter relating thereto has been presented by the main group of light fields, and a new subject appearing when other matter is presented by the main group of light fields. Or, the main row or group of light fields may present advertising matter, line by line, while during such time the auxiliary fields present the name of the advertiser, such name disappearing and another name appearing when said advertisement has been completed and another is begun in the main group of light fields. The auxiliary portion of the apparatus may be so associated with the main portion of the apparatus as to be controlled by the latter. This is the arrangement shown by the drawings.

The auxiliary apparatus has a stop-form belt which is the same in all respects as the stop-form belt in the main portion of the apparatus, excepting that it need not be so long (because it stands for a smaller number of representations) and the teeth on the sides of said belt are modified to become cogs for receiving a pinion at each side of the belt for shifting the latter. The light fields are like those already described and are located near, and preferably above, the latter. And between the lamps of said light fields and stop-forms, the apparatus is the same as in the main portion of the apparatus. The escapement mechanism of the main portion of the apparatus is omitted from the auxiliary portion of the apparatus and so are the electric motor and the parts associated therewith for controlling the flow of air to the pneumatic motors. In such auxiliary portion of the apparatus, the flow of air to the pneumatic motors is controlled by the stop-form belt of the main portion of the apparatus.

In the edges of the belt, D, are horizontal sockets, $I^1$, spaced the same as the teeth, $D^{12}$, on said belt. Pins, $I^2$, are set into said sockets (at points timed for changes in the representations of the auxiliary light fields) and allowed to project into the path of a valve lever, $I^3$, which is connected with the plug of a vented valve, $I^4$, said valve connecting a pipe, $I^5$, leading from a compressed air tank, and a pipe, $I^6$, leading to the pneumatic motor, $I^{15}$—$I^{16}$.

The pneumatic motor, $C^8$—$C^9$—$C^6$, is the same in construction and relation and receives air from a pipe, $C^{10}$, as has already been described in connection with the main portion of the apparatus. In the pipe, $C^{10}$, adjacent the motor, $I^{15}$—$I^{16}$, is a valve, $I^7$, similar to the valve $I^4$, and having an arm, $I^8$, which is drawn to the closed position by the contracting coiled spring, $I^9$. Said arm is in the path of an arm, $I^{10}$, which loosely surrounds a rotatable shaft $I^{11}$, and bears a pawl, $I^{12}$, which is set for engagement with a ratchet wheel, $I^{13}$, rigidly surrounding said shaft adjacent said arm, $I^{10}$. Said pawl is carried on one end of a piston rod, $I^{14}$, the other end of which rod is secured to a piston, $I^{15}$, in the cylinder, $I^{16}$, the ratchet teeth of the ratchet wheel and said pawl being directed for engagement with each other when said piston rod is driven outward from said cylinder. As above described, the pipe, $I^6$, leads to said cylinder, so that the air is driven into said cylinder whenever the valve, $I^4$, is opened. When said valve is closed and vented, the piston in said cylinder is free to be retracted by a contracting spring, $I^{18}$. When the piston is driven forward, the arm, $I^{10}$, is driven in the same direction and into engagement with the valve arm, $I^8$, the latter being driven out of the closed into the open position. And in the path of said arm, $I^{10}$, is also a valve arm, $I^{19}$, which is on a vented cut-off valve, $I^{20}$, located in a pipe, $I^{21}$ leading from the pipe, $C^{10}$, into the cylinder, $I^{22}$, in which is a piston, $I^{23}$, on which is a piston rod, $I^{24}$, which is adapted to bear against a switch lever, $I^{25}$, which bears an insulation block, $I^{26}$, on one side of which is a metallic conductor plate, $I^{27}$, adapted to make contact with the switch plates, $I^{28}$, and on the other side of said insulation block is a conductor plate, $I^{29}$, adapted to make contact with the switch plates, $I^{30}$. When said switch lever, $I^{25}$, is driven by said piston rod, the conductor plates are put into contact with the adjacent switch plates and the circuit is completed. The tension wire, $B^{14}$, is attached to the free end of the switch lever, $I^{25}$, in the same manner as said wire is attached to the pawl, $H^7$, in Fig. 8; and said switch-lever is drawn backward to its normal position (against the stop, $I^{31}$) by said wire when the air is vented from the pipe, $I^{21}$, upon the closing of the valve, $I^{20}$.

The piston rod, $I^{24}$, is short enough to permit an interval of forward movement before it engages the switch lever, $I^{25}$. During that interval of movement, the piston rod, $C^6$, in the cylinder, $C^8$, is driven forward against one of the stop bars of the adjacent stop form. But further provision is made for the movement of the piston rod, $C^6$, before the closing of said switch. This is done by so relatively locating the valve arms, $I^8$ and $I^{19}$ as to cause the engagement of the valve arm, $I^8$, with the arm, $I^{10}$, before the valve arm, $I^{19}$, engages with the arm, $I^{10}$, in order that the valve, $I^7$, may open a little sooner than does the valve, $I^{20}$. In order that the arm, $I^8$, may be held in the open position while the arm, $I^{10}$, passes on into engagement with the arm, $I^{19}$, the arm $I^8$, is bent in the direction of the arm, $I^{19}$, so as to lie beside the path of the end of the arm, $I^{10}$.

To limit the forward movement of the piston rod, $I^{14}$, and the arm, $I^{10}$, a stop, $I^{32}$, is placed into the path of the arm, $I^{10}$, said stop, in the form shown in the drawings, being a screw extending through a stationary support, $I^{33}$. But the pawl, $I^{12}$, must engage the wheel, $I^{13}$, during only the first part of the pawl's advance movement. For the shifting of the stop-form belt by the rotation of said wheel must cease before the piston rod, $C^6$, is driven forward by the opening of the valve, $I^7$. To disengage said pawl during the latter portion of its advance movement, a cam, $L$, is fixed in the path of an arm, $L^1$, on said pawl, said cam turning said arm and lifting the pawl. A contracting coiled spring, $I^{34}$, is shown applied to the arm, $I^{19}$, to return the latter to its normal position after its release from the arm, $I^{10}$. For the shifting of the stop-form belt, cog gearing is substituted for the escapement mechanism used for such purpose in Figs. 8 and 9.

Suitably spaced horizontal cog teeth, $J^1$, are placed upon the edges of the stop-form belt in lieu of the teeth, $D^{12}$, of Figs. 8 and 9. A spur gear wheel, $J^2$, meshes with said teeth; and said gear wheel is mounted upon a shaft, $J^3$, resting in stationary bearings, $J^4$. On the opposite end of each of said shafts is a worm gear wheel, $J^5$, which is engaged by a worm, $J^6$, on the shaft, $I^{11}$, already described. Said shaft is given a partial rotation, clockwise, as viewed in Fig. 21, during each forward movement of the piston rod, $I^{14}$, whereby said worm, said worm gear wheel, the shaft, $J^3$, and the spur gear wheel, $J^2$, are given a partial rotation to move the adjacent portion of the stop-form belt upward one step—a distance equal to the height of one of the stop bars. This distance is obtained by establishing a proper relation between the members of the train of gearing above described.

A plurality of light fields and motors, etc., may be used in the auxiliary apparatus as in the main apparatus.

In the pipe, $I^6$, is a regulating or limiting valve, $I^{35}$, by means of which the flow of air through said pipe may be varied. A similar valve, $I^{36}$, is located in the pipe, $C^{10}$, between the valve, $I^7$, and the cylinder, $C^8$, for varying the flow of air to the cylinder, $C^8$; and a similar valve, $I^{37}$, is located in the pipe, $I^{21}$, between the pipe, $C^{10}$ and the valve, $I^{20}$, for varying the flow of air through said pipe, $I^{21}$.

Any representation made by the auxiliary apparatus will stand unchanged until a pin, $I^2$, on the main stop-form belt engages the valve lever, $I^3$, of the auxiliary apparatus. The auxiliary apparatus, by the movements above described, shifts from that representation to another. In effecting such shifting, it is desirable that the valve, $I^4$, be kept closed long enough to permit the rearward movement of the pistons in the three pneumatic motors of the auxiliary apparatus. This result is attained by so timing the valve lever, $I^3$, and the pin, $I^2$, as to cause the pin to lift said valve lever and close the valve during one step and continue to hold said lever against its return by the contracting spring, $I^{38}$, until said pin makes its next step upward. Then the pistons of the three pneumatic motors of the auxiliary apparatus have for their rearward movement a period equal to the time between shifts of the main stop-form belt. As soon as the lever, $I^3$, slips out of engagement with the pin, $I^2$, the spring, $I^{38}$, draws said lever downward and again admits air into the pipe, $I^6$, for shifting the auxiliary apparatus to make the next representation.

In Figs. 23, 24, 25, and 26, I illustrate a modification of the circuit-closing mechanism for the individual lamps of each light field. In Figs. 1, 2, 3, 5, 6 and 7, a cylinder is used as a part of such apparatus. In the modified apparatus, a rotary, metallic, insulated disk is substituted for the cylinder. K is such a disk. In radial contact rows, it has slots, K¹, similar to the slots, B⁵, in the cylinder, B. Said disk is supported upon an upright axle, K², resting slidably and rotatably in a fixed upright bearing, K³. The lower end of said shaft projects below said bearing and supports a grooved pulley, K⁴, similar to the grooved pulley, B²⁰, in Fig. 5 and receives the cord, C¹. Above said disk is a fixed horizontal bar, K⁵, which supports a series of flexible brushes, K⁶, corresponding to the brushes, B¹, of Fig. 5, the free ends of said brushes, K⁶, being extended downward so as to bear against the upper face of the disk when the latter is in its upper position, but so as to let said ends stand in the slots, K¹, without contact with the disk when said slots are beneath said ends. Said disk is raised by means of a bell crank, K⁸, one arm of which is horizontal and bears against the lower end of the shaft, K², while the other arm extends downward and is connected to the wire, B¹⁴, of Figs. 5, 7, 7ª and 8. By drawing said wire toward the right, the bell crank is turned so as to move its horizontal arm upward for the lifting of the shaft, K², and the disk, K. This movement is timed the same as the movement of the deflecting bar, B⁸, in Figs. 5, 5ª and 6.

In Fig. 26, a contact wheel, K⁹, is applied to the free end of the brush, K⁶, said wheel being arranged to bear upon the upper face of said disk, but to stand out of contact when it enters one of the slots, K¹. Current wires lead from the brushes, K⁶, to the individual lamps as described in connection with the other form. A brush, K¹⁰, similar to the brush, B², of Figs. 5 and 7, is mounted upon the bar, K⁵, and bears upon the disk, K, and receives current from the main wire, A¹³. And a spring is to be used for returning the disk to its initial position, as is done with the cylinder, B. The bar K⁵, is supported from the columns, B¹⁵, rising from the bottom plate, B¹¹, in which is the bearing, K³. The housing, B¹⁸, extends over this apparatus as in the other form, but it and the columns, B¹⁵, are not so high in this case as in the first form.

When the representations made by the light fields of either the main or the auxiliary apparatus are to be made double—with duplicate sets of light fields facing in opposite direction—the letters of the two representations will read from opposite ends of the assemblage of frames. And a cord, C¹⁵, may have one end secured to and wound around each wheel, B²⁰, while its other end is wound around and secured to the wheel, B²⁰, of the corresponding cylinder for the opposite set of light fields, whereby simultaneous rotation may be imparted to two cylinders from the same motor. (See Fig. 28.)

I claim as my invention:

1. In an apparatus of the nature described, the combination of a light field comprising a group of compartments, electric lamps in such compartments, an individual conductor leading to each of said lamps, automatic mechanism adjacent said group of compartments for putting varying numbers of said conductors into circuit, separately located automatic power means, and a windable member extending from said power means to the mechanism for putting said conductors into circuit, substantially as described.

2. In an apparatus of the nature described, the combination of a plurality of light fields each comprising a group of compartments, electric lamps in such compartments, an individual electric conductor leading to each of said lamps, an automatic mechanism adjacent each group of compartments for putting varying numbers of conductors into circuit, separately located automatic power means, and a windable member extending from said power means to the mechanisms for putting said conductors into circuit, substantially as described.

3. In an apparatus of the nature described, the combination of a light field comprising a group of compartments, electric lamps in said compartments, a frame surrounding and supporting said group of compartments, means for supplying electric current to varying numbers of said lamps, said means comprising a multiple circuit-closing device supported by said frame, separately located automatic power means, and a windable member extending from said power means to said circuit-closing device, substantially as described.

4. In an apparatus of the nature described, the combination of a plurality of light fields each comprising a group of compartments, electric lamps in said compartments, frames surrounding and supporting said groups of compartments, each such means comprising a multiple circuit-closing device supported by the frame of the corresponding group of compartments, separately located automatic power means, and a windable member extending from said power means to the said circuit-closing devices, substantially as described.

5. In an apparatus of the nature described, the combination of a light field comprising a group of compartments, a frame surrounding and supporting said group of compartments, lamp supports located behind said compartments, lamps supported by said supports and extending into said compartment, means for supplying electric current to varying numbers of said lamps, said means comprising multiple circuit-closing mechanism supported by said frame, separately located automatic power means, and a windable member extending from said power means to said circuit-closing mechanism, substantially as described.

6. In an apparatus of the nature described, the combination of a plurality of light fields each comprising a group of compartments, a plurality of frames, one surrounding and supporting each group of compartments, means for each group of compartments for supplying electric current to varying numbers of the lamps of said compartments, each such means comprising multiple circuit-closing mechanism supported by said frame, separately located automatic power mechanism and a windable member extending from said power mechanism to said circuit-closing mechanism, substantially as described.

7. In an apparatus of the nature described, the combination of a light field comprising a group of compartments, electric lamps in such compartments, mechanism for supplying electric current to varying numbers of said lamps, said mechanism comprising a stop-form belt containing a series of belt sections and stop holders removably secured to said belt sections, substantially as described.

8. In an apparatus of the nature described, the combination of a plurality of light fields, each such field comprising a group of compartments, electric lamps in such compartments, means for supplying electric current to varying numbers of said lamps, said means comprising a stop-form mechanism, a cylinder, piston and piston rod, the outer ends of said piston rods being arranged in the same plane while said cylinders are staggered, and the inner portion of said pistons being correspondingly extended out of said plane, substantially as described.

9. In an apparatus of the nature described, the combination of a light field comprising a plurality of compartments, electric lamps in such compartments, means for supplying electric current to varying numbers of said lamps, said means comprising multiple circuit-closing means, motor mechanism for actuating said circuit-closing means, and stop-form mechanism for limiting the action of said motor mechanism, substantially as described.

10. In an apparatus of the nature described, the combination of a light field comprising a plurality of compartments, electric lamps in such compartments means for supplying electric current to varying numbers of said lamps, said means comprising multiple circuit-closing means, fluid pressure motor mechanism for actuating said circuit-closing means, and automatic stop-form mechanism for limiting the action of said motor mechanism, substantially as described.

11. In an apparatus of the nature described, the combination of a light field comprising a plurality of electric lamps, electric conductors leading to said lamps, circuit-closing mechanism, a motor for controlling said circuit-closing mechanism, a multiple shiftable stop-form mechanism, and automatic step mechanism for shifting said stop-form mechanism, substantially as described.

12. In an apparatus of the nature described, the combination of a light field comprising a plurality of electric lamps, electric conductors leading to said lamps, circuit-closing mechanism, a fluid pressure motor for controlling said circuit-closing mechanism, a multiple shiftable stop-form mechanism, automatic step mechanism for shifting said stop-form mechanism, said step mechanism comprising a motor for also controlling the first mentioned motor, substantially as described.

13. In an apparatus of the nature described, the combination of a light field comprising a plurality of electric lamps, electric conductors leading to said lamps, circuit-closing mechanism, a fluid pressure motor for controlling said circuit-closing mechanism, a multiple shiftable stop-form mechanism, and automatic step mechanism for shifting said stop-form mechanism, substantially as described.

14. In an apparatus of the nature described, the combination of a light field comprising a plurality of electric lamps, electric conductors leading to said lamps, circuit-closing mechanism, a fluid pressure motor for controlling said circuit-closing mechanism, a multiple shiftable stop-form mechanism, automatic step mechanism for shifting said stop-form mechanism, a fluid pressure motor for controlling said step mechanism, a valved fluid pressure pipe communicating with said fluid pressure motors, and a motor for actuating the valves of said pipe, substantially as described.

15. In an apparatus of the nature described, the combination of a light field comprising a plurality of electric lamps, electric conductors leading to said lamps, multiple circuit-closing mechanism, a fluid pressure motor for controlling said circuit-closing mechanism, a multiple shiftable stop-form mechanism distinct from said circuit-closing mechanism, step mechanism for shifting said stop-form mechanism, a fluid pressure motor for controlling said step mechanism, a main switch on said conductors, a valved fluid pressure pipe communicating with said fluid pressure motors, and a motor for actuating the valve of said pipe and said main switch, substantially as described.

16. In an apparatus of the nature described, the combination of a light field comprising a plurality of electric lamps, electric conductors leading to said lamps, multiple circuit-closing mechanism, a motor for controlling said circuit-closing mechanism, a shiftable stop-form mechanism distinct from said circuit-closing mechanism, mechanism for shifting said stop-form mechanism, a main switch on said conductors, and a motor for controlling said switch, substantially as described.

17. In an apparatus of the nature described, the combination of a light field comprising a plurality of electric lamps, electric conductors leading to said lamps, a main circuit conductor, a main switch for said conductor, a group of brushes for the conductors leading to said lamps, a contact member adapted to make contact with said brushes and connected with the main conductor, means for putting said contact member and said brushes into and out of contact, automatic means for relatively shifting said group of brushes and said contact member various distances, means, independent of the last-mentioned means for actuating said main switch in advance of the separation between said brushes and said contact member and after the making of contact between said brushes and said contact member, substantially as described.

18. In an apparatus of the nature described, the combination of a light field comprising a plurality of electric lamps, electric conductors leading to said lamps, main circuit conductors a main switch for said conductors, a group of brushes for the conductors leading to said lamps, a contact member adapted to make contact with various numbers of said brushes and connected with one of the main conductors, means for putting said contact member and said brushes into and out of contact, automatic means for relatively shifting said group of brushes and said contact member, through various distances, means for limiting the action of said shifting means, means, independent of the last-mentioned means for actuating said main switch in advance of the separation between said brushes and said contact member and after the making of contact between said brushes and said contact member, substantially as described.

19. In an apparatus of the nature described, the combination of a plurality of light fields, each such field comprising a group of compartments, electric lamps in such compartments, conductors leading to said lamps, a group of brushes joined to said conductors, a multiple contact member, said contact member and said group of brushes being automatically and relatively shiftable when new groups of lamps in the light fields are to be lighted, a separate motor in operative relation with the contact member and the group of brushes of each light field for relatively shifting said brushes and said contact member over each other through various distances, and stop-form mechanism distinct and separate from said brushes and said contact member in operative relation with said motors for limiting their movement, substantially as described.

20. In an apparatus of the nature described, the combination of a plurality of light fields, each such field comprising a group of compartments, electric lamps in such compartments, electric conductors leading to said lamps, multiple circuit-closing mechanism located adjacent each field, a motor, and means operatively connecting said circuit-closing mechanism and said motor and actuating said circuit-closing mechanism through automatically varied degrees, substantially as described.

21. In an apparatus of the nature described, the combination of a light field comprising a group of compartments, electric lamps in such compartments, current conductors leading to said lamps, a group of brushes connected with said conductors, a contact member having a plurality of contact lines, means for relatively shifting said contact member and said group of brushes through automatically varied distances to bring different contact lines opposite said group of brushes, said shifting means comprising a motor, substantially as described.

22. In an apparatus of the nature described, the combination of a light field comprising a group of compartments, electric lamps in said compartments, electric conductors leading to said lamps, a group of brushes connected with said conductors, a multiple contact member, said member and said brushes being relatively shiftable over the face of said contact member and transversely to the face of said contact member, means for relatively moving said brushes and said contact member through automatically varied distances over the face of said contact member, and means for relatively moving said brushes and said contact member transversely to the face of said contact member, said moving means being so timed as to cause, when they bear against each other, the relative movement of said group of brushes and said contact member from each other before they are relatively moved over the face of said contact member, and so that they are relatively moved toward each other, when separated, after being relatively moved over the face of said contact member, substantially as described.

23. In an apparatus of the nature described, the combination of a light field comprising a plurality of compartments, electric lamps in said compartments, electric conductors leading to said lamps, circuit-controlling mechanism operatively connected with said conductors, a motor in operative relation with said circuit-controlling mechanism, a shiftable step mechanism for limiting the action of said motor, a motor for shifting said stop mechanism, and a third motor for successively directing power to said first and second mentioned motors, substantially as described.

24. In an apparatus of the nature described, the combination of a light field comprising a group of compartments, electric lamps in such compartments, means for supplying electric current to varying numbers of said lamps, said means comprising a main stop-form mechanism, and another light field comprising a group of compartments, electric lamps in said compartments, means for supplying electric current to varying numbers of said lamps, said means comprising an auxiliary stop-form mechanism in operative relation with said stop-form mechanism, substantially as described.

25. In an apparatus of the nature described, the combination of a light field comprising a group of compartments, electric lamps in such compartments, means for supplying electric current to varying numbers of said lamps, said means comprising a main stop-form mechanism, and an auxiliary group of lights in operative relation with said main stop-form mechanism, substantially as described.

26. In an apparatus of the nature described, the combination of a plurality of light fields each comprising a plurality of compartments, electric lamps in such compartments, means for supplying electric current to varying numbers of said lamps, said means comprising multiple circuit-closing means, and a motor in operative relation with each of said circuit-closing means for simultaneously operating the latter, and automatically variable mechanism for limiting the action of said motor, substantially as described.

27. In an apparatus of the nature described, the combination of electric circuit-closing mechanism, a motor in operative relation with said circuit-closing mechanism, and a stop-form for varying the action of said motor, substantially as described.

28. In an apparatus of the nature described, the combination of a relatively shiftable multiple contact member and a group of brushes, a motor in operative relation for relatively shifting said contact member and said group of brushes, and a stop-form for varying the action of said motor, substantially as described.

29. In an apparatus of the nature described, the combination of a shiftable multiple contact member and a group of brushes, a motor in operative relation with said contact member for shifting the latter, and a stop-form for varying the action of said motor, substantially as described.

In testimony whereof I have signed my name, in presence of two witnesses, this 3rd day of March, in the year one thousand nine hundred and ten.

JAMES B. LEE.

Witnesses:
CYRUS KEHR,
CARRIE R. IVY.

Copies of this patent may be obtained for five cents each, by addressing the "Commissioner of Patents, Washington, D. C."